United States Patent [19]
Hülsmann et al.

[11] 4,137,399
[45] Jan. 30, 1979

[54] METHOD OF PREPARING FUNCTIONALIZED CELLULOSES

[75] Inventors: Hans L. Hülsmann, Wetter; Gustav Renckhoff, Witten, both of Germany

[73] Assignee: Dynamit Nobel Aktiengesellschaft, Troisdorf, Bezirk Cologne, Germany

[21] Appl. No.: 838,432

[22] Filed: Sep. 30, 1977

[30] Foreign Application Priority Data

Oct. 2, 1976 [DE] Fed. Rep. of Germany ....... 2644678

[51] Int. Cl.$^2$ .......................... C08B 3/00; C08B 3/14; C08B 11/00; C08B 15/06
[52] U.S. Cl. ........................................ 536/32; 536/43; 536/58; 536/63; 536/84
[58] Field of Search ...................... 536/32, 43, 58, 63, 536/84; 252/DIG. 4

[56] References Cited

U.S. PATENT DOCUMENTS

| | | | |
|---|---|---|---|
| 2,730,427 | 1/1956 | Suen | 536/84 |
| 3,023,183 | 2/1962 | Nelson | 252/DIG. 4 |
| 3,936,441 | 2/1976 | Holst et al. | 536/98 |
| 3,971,743 | 7/1976 | Breslow | 536/84 |
| 4,024,335 | 5/1977 | Nicholson | 252/DIG. 4 |

Primary Examiner—Ronald W. Griffin
Attorney, Agent, or Firm—Sprung, Felfe, Horn, Lynch & Kramer

[57] ABSTRACT

Production of cellulose derivatives substituted by groups having functional moieties by reaction of a hydroxyl group(s) of the cellulose with an at least bifunctional reagent. The reagent is reacted with cellulose dissolved in dimethylsulfoxide containing polyhydroxymethylene.

8 Claims, No Drawings

METHOD OF PREPARING FUNCTIONALIZED CELLULOSES

BACKGROUND

The chemical alteration of cellulose for the purpose of introducing functional groups of specific reactivity has until now been a great preparative and technical problem. The reasons for this are mainly the following:

Cellulose contains for each glucose structural unit of its macromolecule three free but poorly reactive hydroxyl groups, a primary one on carbon atom 6 and two secondary ones on carbon atoms 2 and 3. If their reactivity is compared with that of low-molecular alkanols, the first difference is found to be that the primary hydroxyl groups are less reactive than the secondary. Then, the secondary hydroxyl group on carbon atom 3 is thus less reactive for sterical reasons than the one on carbon atom 2.

Lastly, the rest of the oxygen atoms of cellulose are in the form of an intramolecular bridge between carbon atoms 1 and 5 or of ether bridges to additional glucose units, and do not participate in reactions.

The reactions at the hydroxyl groups of cellulose are thus generally much more difficult than those of alkanols. For example, while alkanols react spontaneously and completely with isocyanates to form the urethanes, an analogous reaction with cellulose can be performed only under extreme and therefore often harmful conditions. Aside from the poor reactivity of the hydroxyl groups, it is of great importance whether they are in crystalline or in amorphous areas of the cellulose in question. The hydroxyl groups in crystalline areas are more greatly impeded in their reactivity through the formation of hydrogen bridges than those in amorphous regions.

In order to improve the reactivity of cellulose, the hydrogen bridges must be substantially broken up and also the amorphous areas must be expanded. Attempts have been made to bring this about by swelling the cellulose, but not many swelling agents for cellulose have become known. In practice, probably only water can be used, since the other agents are too expensive or too difficult to use. This not only narrows the temperature range that can be chosen, but also makes it impossible to perform reactions with reagents sensitive to water. In attempts to alter swollen cellulose chemically through its alkali salts, its great sensitivity to oxidizing influences is a great drawback.

In any case, the reaction takes place on solid structures of cellulose, which in some cases may be loosened up by swelling, i.e., it takes place in a heterogeneous phase. The disadvantages of such a method of reaction are generally well known.

It would be far more advantageous to introduce groups more capable of forming bonds into the cellulose in the dissolved form instead of the merely swollen form. The two solvents used on a large technical scale for cellulose, namely aqueous ammoniacal solutions of copper(II) tetramine hydroxide and aqueous, alkaline solutions of alkali salts of thiocarboxylic acids, are unsuitable, not merely on account of their water content, as set forth above, but also because, in many cases, a chemical reaction takes place between these solvents and the reagents provided for the functionalization of the cellulose.

THE INVENTION

The subject of the present invention is a method of preparing cellulose derivatives with chemically bound groups rendered capable of forming bonds, which is characterized in that the reactions are performed with bifunctional or polyfunctional reagents, preferably with different reactivity of the groups, on cellulose which is dissolved in dimethylsulfoxide containing polyhydroxymethylene.

The solvent dimethylsulfoxide containing polyhydroxymethylene decisively promotes the reactivity of cellulose. The solvent apparently exposes preferentially the primary hydroxyl groups of the cellulose. The reaction can take place under comparatively mild conditions. Even reagents having a less reactive group A can be reacted. Reactions with the solvent have not been observed, so that, in contrast to the solvents named above describing with the state of the art, the nature of the reagents is not limited. Furthermore, the comparatively high boiling point of the solvent is advantageous, so that pressure vessels are not required.

Cellulose derivatives having chemically bonded groups capacitated for the formation of bonds in the meaning of the invention are those cellulose derivatives in which one or more of the free hydroxyl groups in the cellulose are bonded to the functional group of a substituent, this substituent bearing one or more additional combining functional groups. In general, the functionalized glucose units of the cellulose derivatives prepared in accordance with the invention are accordingly formulated as

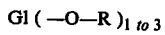

wherein Gl represents a glucose moiety of cellulose and R represents the moiety of the reagent used which is bonded to the oxygen atom of the hydroxy group; wherein R has the structure

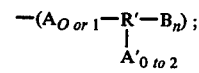

wherein B represents functional groups of the reagent which have not entered into reaction with cellulose and which remain preferentially unaltered in the reaction or, in some cases, have been transformed into another functional group; n represents the basically unlimited number of groups B, which amounts preferably to 1, in some cases to 2, or in special cases as much as 4; A represents a functional group of the reagent which is bound to cellulose and whose index in the case of the ether bond is 0; A' represents a sometimes-present group equal to or different from A, which is capable of the reaction with cellulose, but for reasons of the spatial arrangement does not enter into reaction or, in some cases, reacts with another hydroxyl group of cellulose, and R' represents the moiety of the reagent which contains carbon, or carbon and silicon.

The reagents of the present method are accordingly selected such that at least two functional groups are present, namely, one to three groups A, of which at least one becomes bonded to cellulose in the performance of the process, and at least one second group B identical with A or preferably different therefrom, which under the reaction conditions of Group A is preserved as the same or a different functional group and therefore is contained in the functionalized celluloses as a group or groups rendered capable of combination. For this reason, reagents having varying functional group reactivity are greatly preferred, especially those whose group B remains unaltered under the reaction condiions necessary for group A.

Suitable A groups are, for example, halogen alkyl moieties or carboxylic acid chloride groups which react with cellulose with the formation of an ether bond or ester group, as the case may be, ester groups, carboxylic acid groups, nitro group, amino group, aldehyde groups, and acetal groups. Those or others which remain unaltered in the reaction of the A groups or are transformed to some other functional group capable of forming a bond, are suitable as B groups. Other suitable A groups are alkoxy groups and carbalkoxy groups which react with cellulose with transetherification or transesterification, with the formation of ether or ester groups, in which case other alkoxy and carbalkoxy groups, amino, nitro, aldo and keto groups, glycidyl moieties and thioalkyl moieties can serve as B groups.

Since it is not the nature of the A group, but its presence and its reactivity with the free hydroxyl groups of cellulose that is important, it is also possible, if desired, to use sulfochloride, isocyanate or isothiocyanate and other moieties as group A.

An atom group of limited size is sufficient and preferred as the moiety R' which binds the functional groups. It will contain preferably 2 to 4 aliphatic carbon atoms, and indeed in some cases it will contain only a single methylene group in conjunction with a carboxyl moiety of the B group, or it will contain the benzene, toluene or xylene moiety, or, in the case of an organosilane moiety, it will contain one silicon atom in addition to the moieties named above.

The following can be cited as examples of the reagents to be used: ω-halogenalkanecarboxylic acid esters, such as chloroacetic acid methyl ester or β-bromopropionic acid phenyl ester, halogen alkyl derivatives of aromatic mono- or polycarboxylic acid, such as, for example, chloromethylbenzoic acid methyl ester, aminocarboxylic acid esters, p-nitrobenzoyl chloride, iso- and terephthalic aldehydic acid methyl esters, iso- and terephthalic acid monomethyl ester monochloride, amino derivatives of aromatic or aliphatic acids such as p-aminobenzoic acid alkyl ester, organosilanes such as γ-aminopropyltrimethoxysilane, α-aminopropyltriethoxysilane, p-aminophenyltrialkoxysilanes, γ-glycidyloxypropyltriethoxysilane, ω-thioalkyltrialkoxysilanes such as δ-mercaptobutyltriethoxysilane, mercaptoethyltrimethoxysilane, etc.

In ester groups and ether moieties, the phenyl moiety and alkyl groups having 1 to 4 carbon atoms are preferred.

It is greatly preferred in accordance with the invention that the reaction with substituted trialkoxysilanes be an etherification reaction, since the alkoxy moieties bonded to silicon react easily and require no etherification catalysts.

In the reaction products, the substituent group of the silanes is obtained as an aminoalkyl, glycidyl alkyl, or mercaptoalkyl moiety or corresponding phenyl moiety, and at least one ether oxygen is developed between the glucose unit and the silicon of the silane, plus a second ether bond and, though with very little probability, a third ether bond per silane molecule, depending on the steric accessibility of additional hydroxyl groups of the cellulose.

The method can generally be practiced in the following manner:

The starting materials can be native celluloses present, for example, in cotton or wood, or cellulose regenerated from solutions. Cotton linters, or low-lignin or lignin-free wood cellulose are preferred.

The amount of the solvent is such that a not too highly viscous solution of cellulose will be formed which can be stirred. For this purpose, 10 to 30 weight-parts of solvent per weight-part of cellulose are sufficient, but a larger amount can be used.

The concentration of the polyhydroxymethylene in the solvent system with dimethylsulfoxide can be varied within wide limits. Preferred are contents of 5 to 20 weight-percent of polyhydroxymethylene with respect to the dimethylsulfoxide. Commercial paraformaldehyde can be used as the polyhydroxymethylene.

It is surprising that the polyhydroxymethylene does not enter the reaction as such.

Dimethylsulfoxide alone is not a solvent for cellulose.

The reactions of the dissolved cellulose with the bifunctional or polyfunctional reagents take place in the conventional manner specific for the particular type of reaction such as, say, etherification, acylation, esterification or transesterification, and the conventional catalysts can be used. Preferred transesterification catalysts are titanic acid esters such as, for example, n-butyl titanate, or magnesium alcoholates such as magnesium ethylate.

In the reaction of carboxylic acid chlorides and chloralkanes, alkali, such as sodium hydroxide, for example, is present in the usual manner. The reaction can also take place in a purely thermal manner.

The reaction conditions are those for the reaction of the particular reagents with the hydroxyl groups of the cellulose.

Since the reaction of the dissolved cellulose can be performed under mild conditions, the reaction in an open vessel surmounted by a reflux condenser is greatly preferred. The temperatures then will be between room temperature and the boiling point of the solvent, preferably between about 40 and about 186° C. However, it is possible to apply slight overpressures up to, say, 50 bars, for the purpose of reacting the less reactive reagents, or of reacting additionally the above-mentioned less reactive hydroxyl groups of cellulose.

After the reaction is completed, the cellulose derivatives are precipitated from the reaction mixtures. The liquids to be added as precipitating agents are accordingly selected such that the particular functionalized cellulose involved will be insoluble in it, but the by-products soluble. Preferred precipitants are, for example, low-molecular alkanols, aliphatic, cycloaliphatic and/or aromatic hydrocarbons, esters of short-chain fatty acids, and short-chain ketones.

The products of the process can be used in a basically similar manner, independently of the introduced moiety of the reagent and its functional group B, in that a reaction of the B group that has been made capable of bonding is performed with synthetic or natural compounds, especially dissolved ones. For example, the compound is transformed to an insoluble form from which the compound can be re-released. Of especial value is a selective reaction with the components of a mixture of substances which are to be isolated, on the basis of the available wide choice of group B.

Depending on the nature of the functional group of the cellulose derivative and of the reactive group of the compound that is to be fixed, the bond can be polar or nonpolar.

The products are suitable, furthermore, for example, as catalyst supports, ion exchangers, chromatography absorbents, etc.

The products are especially usable for the preparation of immobilized bioactive proteins e.g. enzymes or other soluble biological active pharmaceuticals, which form a solid body together with the product, the bioactivity of this immobilizate being greater respective the volume and better standardizeable and more resistant against deactivation than the enzyme itself.

EXAMPLES

The method of the invention will now be explained with the aid of the following examples.

EXAMPLE 1

10 grams of powdered linters cellulose ("MN 200", manufactured by Macherey, Nagel & Co., Duren) were dissolved in a 500 milliliter flask equipped with stirrer, thermometer and electrical heater, in a mixture of 190 g of dimethylsulfoxide and 10 g of paraformaldehyde, at 50° C. At this temperature, after the addition of 0.1 g of finely powdered sodium hydroxide, a solution of 10 g of p-chloromethylbenzoic acid methyl ester in 30 g of dimethylsulfoxide was added in portions over a period of 30 minutes. Then the mixture was stirred for four hours at 50° C. The reaction mixture, cooled to room temperature, was then poured into ethanol while the latter was being stirred vigorously. The solid was suction filtered, suspended repeatedly in ethanol until all the soluble substance had been removed, and dried. The yield was 10.6 g. The product was free of chlorine and acid.

According to analysis, there was a content of 8.2 wt.-% of carbomethoxy groups in the functionalized cellulose. Accordingly, 28.4% of the free hydroxyl groups of the cellulose had been etherified by the entry of the group:

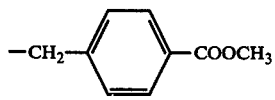

EXAMPLE 2

Example 1 was repeated, using 10 g of raw cotton (DAB 7) instead of cellulose powder.

The product had a content of 6.0 wt.-% of carbomethoxy groups, corresponding to a 19.4% transformation of the free hydroxyl groups of the cellulose.

EXAMPLE 3

10 g of powdered linters cellulose ("MN 200") was dissolved in dimethylsulfoxide and paraformaldehyde as described in Example 1. After the addition of 5 g of p-nitrobenzoyl chloride and 0.05 g of sodium hydroxide, the mixture was stirred for two hours at 70° C., then heated at the boiling temperature for 30 minutes on the reflux condenser while a slow stream of nitrogen was passed through the apparatus. After standing overnight, the mixture was poured into a mixture of equal parts of ethanol and toluene by volume, with vigorous agitation. The precipitate was washed first with ethanol and then with water, and dried. The yield was 10.5 grams.

The nitrogen content in the product was 1.5 wt.-% on the basis of the introduced nitrobenzoyl moiety.

EXAMPLE 4

10 g of cellulose powder ("MN 200") were stirred in a mixture of 190 g of dimethylsulfoxide and 10 g of paraformaldehyde at 115° C. 20 g of γ-aminopropyltriethoxysilane was added to the solution obtained after three hours of stirring, and was reacted at 80° C. After 30 minutes of reaction time, 100 ml of water was added. The mixture was stirred for 5 hours at 90° C. Then the reaction product was precipitated by the addition of 500 ml of water, and washed and dried. The yield was 11.0 g. The nitrogen content in the product amounted to 2.9 wt.-% on the basis of the aminopropyl alkoxysilyl moiety.

EXAMPLE 5

Example 4 was repeated, but γ-mercaptopropyltrimethoxysilane was used instead of γ-aminopropyltriethoxysilane. A sulfur determination in the reaction product showed a content of 3.6 wt.-% on the basis of the mercaptopropylalkoxysilyl moiety contained therein.

EXAMPLE 6

Example 5 was repeated using γ-glycidyloxypropyltrimethoxysilane for the functionalization instead of γ-mercaptopropyltrimethoxysilane. The γ-glycidyloxypropyl group content amounted to 13.4 wt.-% on the basis of the incorporated glycidyloxypropyl alkoxysilyl moiety.

What is claimed is:
1. In the production of cellulose substituted by a group having a functional moiety or moieties capable of forming respectively a bond or bonds, wherein cellulose is contacted with an at least bifunctional reagent for reaction of a hydroxy group of the cellulose with the bifunctional reagent to form said substituted cellulose, the improvement which comprises contacting the reagent with cellulose dissolved in dimethylsulfoxide containing polyhydroxymethylene for said reaction of the cellulose and reagent to form said substituted cellulose.
2. Process of claim 1, wherein the reagent has at least two different functional groups.
3. Process of claim 1, the reagent being p-chloromethylbenzoic acid methyl ester.
4. Process of claim 1, the reagent being p-nitrobenzoyl chloride.
5. Process of claim 1, the reagent being γ-aminopropyltriethoxysilane.
6. Process of claim 1, the reagent being γ-mercaptopropyltrimethoxysilane.
7. Process of claim 1, the reagent being γ-glycidyoxypropyltrimethoxysilane.
8. Process of claim 1, wherein said group is of the formula

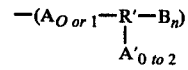

wherein:
B is said functional moiety;
n is 1–4;
A is a group of the reagent bonded to the oxygen atom of the hydroxy group of the cellulose;
A' is a group capable of reaction with cellulose; and
R' is an aliphatic group of 2 to 4 aliphatic carbon atoms or of 1 carbon atom where B is a carboxyl moiety, a group containing a benzene, toluene, or xylene moiety, or an organosilane moiety.